Patented June 7, 1927.

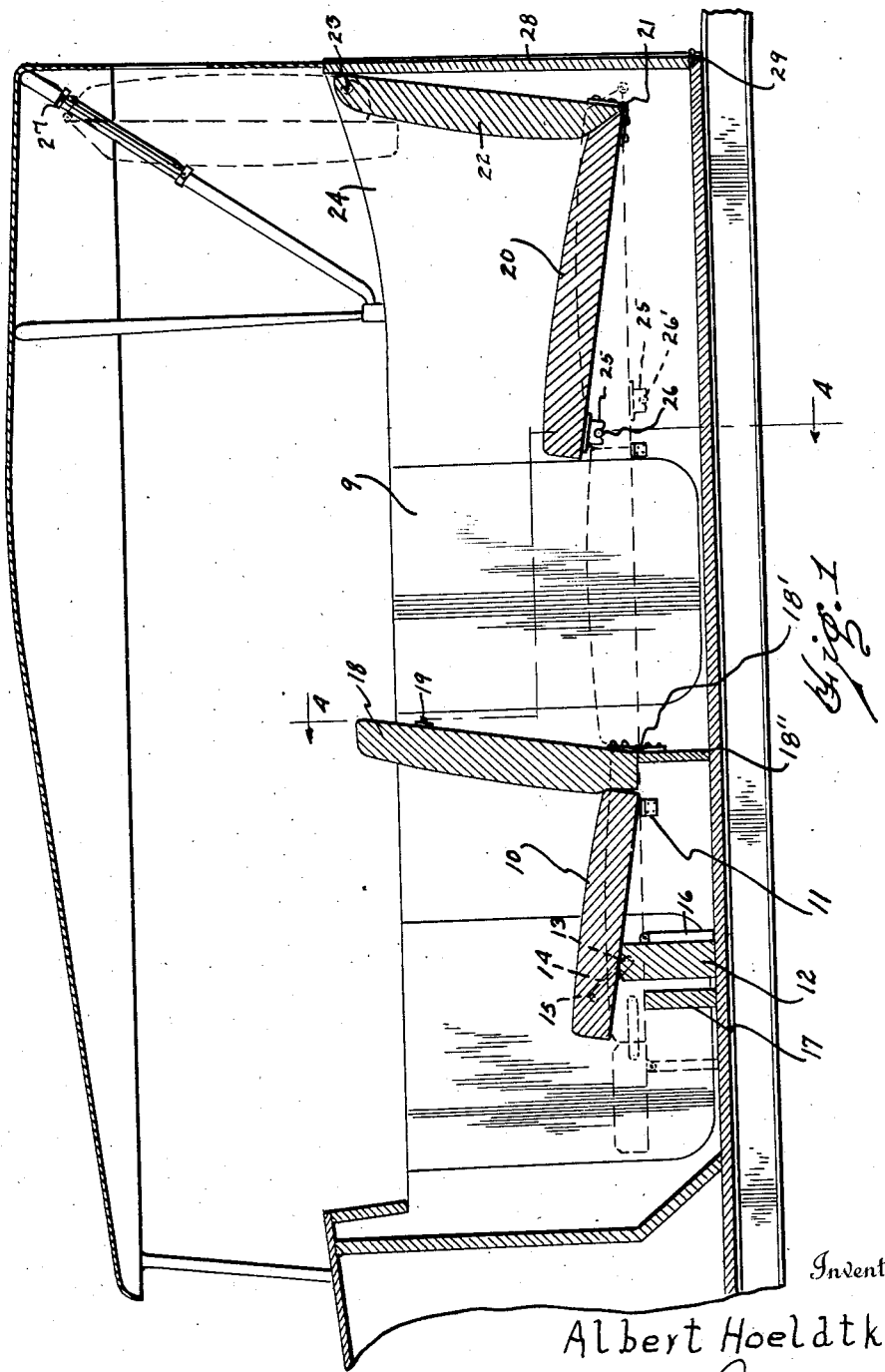

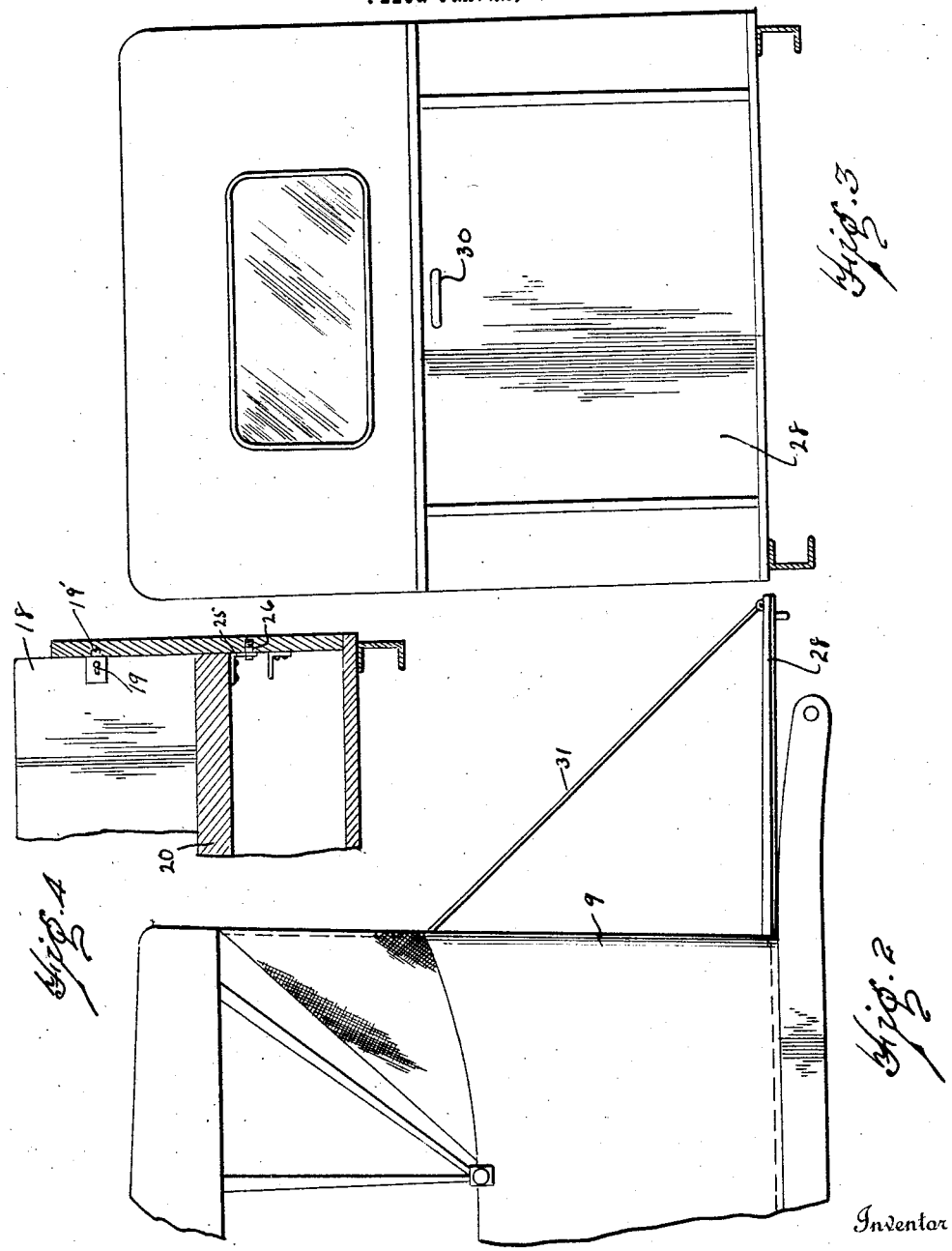

1,631,131

UNITED STATES PATENT OFFICE.

ALBERT HOELDTKE, OF DETROIT, MICHIGAN.

VEHICLE BODY.

Application filed January 22, 1923. Serial No. 614,154.

My invention relates to a new and useful improvement in vehicle bodies and has for its object the provision of a vehicle body which embodies seats for the occupants thereof and so constructed as to permit the positioning of said seats and the back cushions thereof in form to constitute a suitable bed, and also so mounted as to permit the removal of the rear seat and cushion from the body of the vehicle body, to permit the transformation of the vehicle body into a commercial body having the rear portion thereof cleared of any attachments and provided with a back which may be let down to form a suitable end-gate for the vehicle.

Another object of the invention is the provision of a rear seat in the vehicle which may be quickly and easily removed from the body by swinging it to a position in which it will be clear of the body, or by its complete removal from the body.

Another object of the invention is the provision in a vehicle of a rear seat embodying a seating cushion and a back cushion so constructed and mounted in the vehicle as to permit the folding of said cushions upon each other and the removal of the same clear of the main portion of the body of the vehicle.

Another object of the invention is the provision of a vehicle body having swinging cushions mounted therein and means for fixing said cushions in the desired positions.

Other objects will appear hereinafter.

The invention consists in the combination and arrangement of parts hereinafter described and claimed.

The invention will be best understood from a reference to the accompanying drawings which form a part of this specification and in which, Fig. 1 is a longitudinal vertical sectional view of a vehicle body embodying the invention, Fig. 2 is a fragmentary side elevational view of the rear of a vehicle embodying the invention, Fig. 3 is an elevation view showing the rear of a vehicle having the end gate closed, and Fig. 4 is a sectional view taken on substantially line 4—4 of Fig. 1.

The invention is designed for use principally with automobiles, although it is apparent from the description of the device that it may be employed on other kinds of vehicles to which it is adapted. By the invention it becomes possible to so adjust the seat cushions as to form a bed or a sleeping compartment in the vehicle body. The construction is also such as to permit of the ready removal of the rear cushions from obstructing the rear of the vehicle and thus permit the transformation of the vehicle into a commercial car having the rear thereof clear for receiving packages and the like. The rear of the body of the car is so constructed as to permit it lowering to form an end gate, the construction being such that when it is used to form the back of the body of the car this end gate forming portion does not detract any from the appearance of the car, the appearance from the rear being substantially the same as the rear of the body of the conventional touring car body.

The invention, in its preferred form, is adapted for use with a body 9, in which is mounted a front seat cushion 10, which in normal position inclines toward the rear and is supported adjacent its rear end with suitable brackets 11, mounted on the side of the car body. An auxiliary cushion 12 is pivotally mounted to one end 13 of a bar 14, the other end of which is pivotally mounted to the cushion 10, preferably at the side thereof. A drop leg 16 is mounted on the cushion 12, this drop leg being of the conventional type and serving to support the cushion 12 when moved into the bed forming position shown in dotted lines in Fig. 1. In normal position the cushion 12 serves to support the cushion 10, adjacent its forward end, in the rearwardly inclined position, and when moved to the position shown in dotted lines in Fig. 1, serves as an extension of the cushion 10. The cushion 10 is loosely mounted on the brackets 11 and when moved into the bed forming position it is moved rearwardly so that the cross member 17, mounted on the floor of the body serves as a forward support thereof. The back 18 is pivotally mounted by means of a suitable hinge 18′ to the cross member 18″ and when its is desired to use this back 18 as a portion of the bed it is swung to the position shown in dotted lines in Fig. 1, a bracket 11′ serving to support it at each end. The cushion 10 is also moved rearwardly until it engages the edge of the cushion 18, the cushion 10 thus resting on the cross member 18''. When the back 18 is used in the position shown in full in Fig. 1, a suitable latch member 19, engages with an open end of a keeper 19' mounted on the side of the body.

The cushion 20 of the rear seat is hingedly connected by means of a hinge 21 to the back cushion 22, which is pivotally mounted, adjacent its upper end to the sides of the body, the pivotal connection 23 permitting this cushion to be swung upwardly, as shown in dotted lines in Fig. 1, so that the rear of the body is cleared of all obstruction, the pivotal connection 21 permitting the cushion 20 to fold upon the cushion 22. When used in the manner shown in full in Fig. 1, the cushion 20 is inclined rearwardly and is maintained in this position by means of a keeper 25, mounted on said cushion, adapted to engage the stud 26 which projects from the side of the body. When swung to the position shown in dotted lines in Fig. 1, the two cushions are secured in their folded over position by means of a suitable holding means, which in the drawings is shown as a strap secured to the brace of the top of the vehicle body. When the rear cushion is used as a bed forming portion the cushion 20 is lowered until it is level with the lowered cushions 10 and 18, a stud 26' serving to engage the keeper 25.

The back of the body constitutes an end gate 28, which is hingedly connected by means of a hinge 29 to the body of the car and provided with a suitable locking handle 30. When this end gate is closed the appearance of the back of the car does not materially differ in appearance from the back of the ordinary car body, and when it is turned down, as shown in Fig. 2, a very satisfactory end gate is formed which is prevented from moving downwardly past center by a suitable retaining member such as a strap 31.

In this way I have provided a body for vehicles in which a three fold purpose is fulfilled. The car may be used as a passenger car, with the full complement of seats. It may be used as a sleeping car, and it may be used as a commercial car for delivering packages and the like.

The rear cushions which are shown as swung upwardly to clear the body of their obstruction may also, by slight changes be lowered into an opening formed in the bottom of the car body, or they may be mounted so as to be detachable and entirely removable. The feature of having these cushions so arranged as to be removable so as not to obstruct the space of the rear of the body of the car is claimed broadly by me and I do not wish to limit myself to the precise method shown. It is also apparent that many ways of supporting the cushions when they are arranged to form a bed may be devised as well as the means for maintaining the cushion 18 in upright position. These minor changes I do not set forth in the drawings as they are such as the ordinary mechanic working in the art may devise, but I do not wish to limit myself to any of these details but claim broadly to the idea of having a vehicle body in which the threefold purpose is met and carried out.

Having thus described my invention what I claim as new and desire to secure by Letters Patent is:

1. In combination with a vehicle body having sides and a back mounted thereon and provided with a floor, a comparatively thin vertically extending supporting member mounted on said floor extending transversely thereof; a seat back; a hinge secured at one end to the rear surface of said seat back adjacent the lower edge thereof, the opposite end being secured to the rear surface of said supporting member adjacent the upper edge thereof, said seat back being normally upwardly projecting and slightly inclined to the plane of said supporting member and adapted for swinging rearwardly into horizontal position; a supporting bracket mounted on the sides of said body adjacent said support and positioned forwardly thereof; a seat forming member adapted normally for engaging adjacent its rear edge said supporting bracket said seat forming member being forwardly and upwardly inclined; a supporting member hingedly connected to said seat forming member adjacent the forward edge thereof and adapted for supporting said seat forming member in inclined position, said seat forming member being adapted for movement into engagement at its rearward end with said first-mentioned supporting member, said hingedly connecting supporting member being adapted for movement into horizontal alignment with said seat forming member; means mounted on said floor for supporting the forward end of said seat forming member upon movement of said hingedly mounted supporting member into horizontal position; and means for supporting said hingedly mounted supporting member in horizontal position.

2. In combination with a vehicle body having sides and a back mounted thereon and provided with a floor, a comparatively thin supporting member mounted on said floor extending vertically thereto and positioned transversely thereof; a seat back, hingedly connected at its rear surface adjacent its lower edge to the rear surface of said supporting member adjacent its upper edge, and adapted for swinging rearwardly into horizontal position; a supporting bracket mounted on said body for engaging the free end of said back when moved to horizontal position; a seat forming member positioned forwardly of said back adjacent the lower edge thereof, said seat forming member being loose and normally inclining upwardly towards its forward end; movable means for supporting said seat forming member in said inclined position, said seat forming member being movable into horizontal position upon movement of said supporting means to non-supporting position, said supporting means being movable into alignment with said seat forming member when in horizontal position, said seat forming member engaging at its rearward end said vertically extending supporting member.

In testimony whereof I have signed the foregoing specification.

ALBERT HOELDTKE.